United States Patent [19]

Williams

[11] 4,295,629
[45] Oct. 20, 1981

[54] MOULD ASSEMBLY FOR USE IN THE MANUFACTURE OF SPHERICAL OR SUBSTANTIALLY SPHERICAL ARTICLES

[75] Inventor: William Williams, Queniborough, England

[73] Assignee: Delta Mouldings (Leicester) Limited, Leicester, England

[21] Appl. No.: 176,791

[22] Filed: Aug. 11, 1980

[30] Foreign Application Priority Data

Aug. 17, 1979 [GB] United Kingdom ............... 28822/79

[51] Int. Cl.³ ............................................... B29C 1/00
[52] U.S. Cl. .................................... 249/160; 425/812; 264/45.5
[58] Field of Search .................. 425/812, 468; 249/91, 249/93, 95, 160, 163, 168, 169, 173; 264/163, 45.5, 45.6, 45.9, DIG. 83

[56] References Cited

U.S. PATENT DOCUMENTS

| | | | |
|---|---|---|---|
| 2,938,237 | 5/1960 | Kern et al. | 425/812 |
| 3,058,158 | 10/1962 | Aghnides | 249/160 |
| 3,069,170 | 12/1962 | Dillon | 264/DIG. 83 |
| 3,454,257 | 7/1969 | Dupuis | 249/173 X |
| 3,836,308 | 9/1974 | Upright | 249/160 X |
| 3,976,295 | 8/1976 | Heald | 264/45.5 X |
| 4,144,297 | 3/1979 | Tomar | 264/45.5 |
| 4,188,178 | 2/1980 | Anscher | 425/468 X |

Primary Examiner—J. Howard Flint, Jr.
Attorney, Agent, or Firm—Charles E. Brown

[57] ABSTRACT

The invention provides means for producing a moulded plastics ball having the appearance of a conventional ball with a continuous curved seam. In order to make the moulding seam (parting-line) as inconspicuous as possible, the invention provides a mould assembly comprising two mould members, having mutually confronting surfaces each surrounding a part-cavity, a generally spherical mould cavity being defined when the confronting surfaces are in contact with one another, lip portions of said surface defining a continuous parting line around a diametral zone of the cavity, said parting line having four portions, comprising two substantially S-shaped portions with two at least substantially straight-line portions, said portions being arranged alternately around the diametral cavity zone, each portion of the line meeting its adjacent portion to include an angle of not substantially less than a right-angle.

4 Claims, 9 Drawing Figures

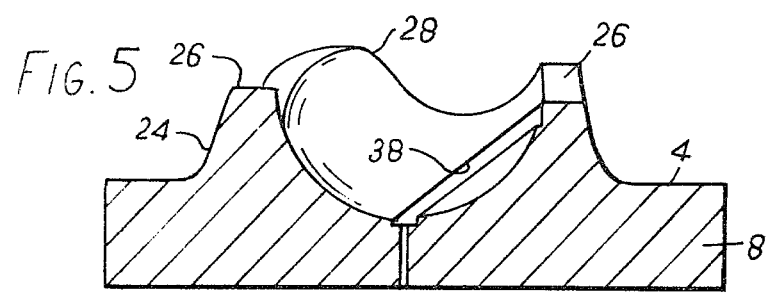
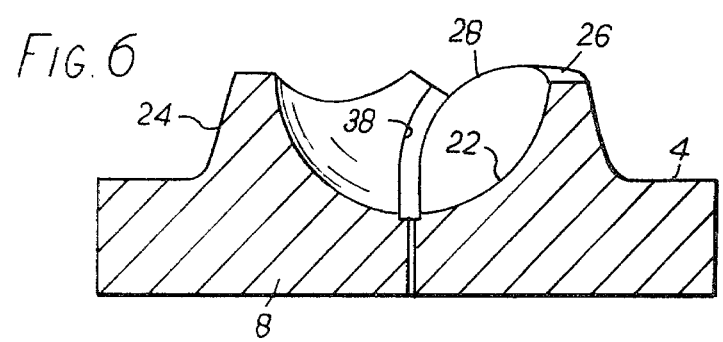
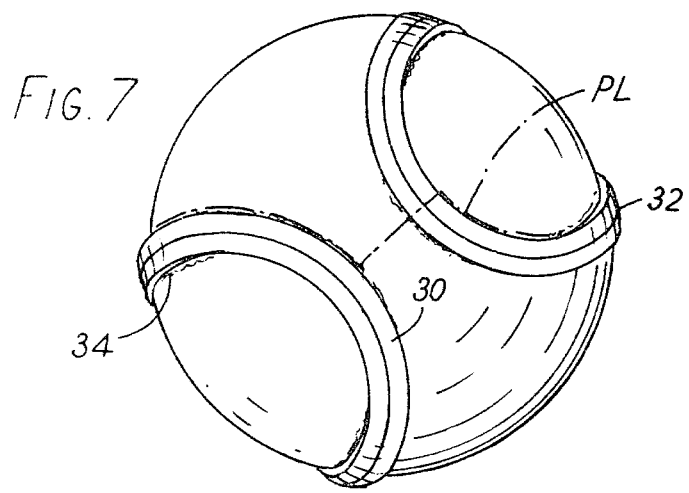

MOULD ASSEMBLY FOR USE IN THE MANUFACTURE OF SPHERICAL OR SUBSTANTIALLY SPHERICAL ARTICLES

BACKGROUND OF INVENTION

The invention relates to a mould assembly for use in the manufacture of spherical or substantially spherical articles, for example, hurling balls, soft-balls, hockey and cricket balls.

It has been customary to produce this type of ball by enclosing a suitable filling in a case comprising of two contoured strips of fabric or leather and stitching or otherwise seaming together edge portions of two strips to form a spherical envelope around the filling, the seam following a path corresponding to that of the simulated seam clearly seen on, for example, a conventional soft ball.

Such production methods are expensive and the present invention sets out to provide means for producing articles having an acceptable appearance simulating that of the conventionally made ball but by means of a moulding operation.

BRIEF SUMMARY OF INVENTION

The present invention provides a mould assembly comprising two mould members having mutually confronting surfaces each surrounding a part-cavity, a generally spherical mould cavity being defined when the confronting surfaces are in contact with one another, lipportions of said surface defining a continuous parting line around a diametral zone of the cavity, said parting line having four portions, comprising two substantially S-shaped portions with two at least substantially straight-line portions, said portions being arranged alternately around the diametral cavity zone, each portion of the line meeting its adjacent portion to include an angle of not substantially less than a right-angle.

If desired, the confronting surface of one mould member is provided with a ridge or wall around the part-cavity, of such a height that the mould member may be filled with mouldable material to a level above that of the lip portions of that mould member.

It will be understood that sports balls are required to be of a specific gravity less than 1, and have often an s.g. value of less than 0.5. This means that a mould cavity is initially provided with moulding material in a quantity of less than half its volume, and a subsequent foaming action takes place during which the entire cavity is filled with foamed material. This is convenient where the mould cavity consists of two similar mould members which confront one another, since it merely requires enough moulding material to fill the part-cavity of one mould member, the entire cavity being then filled by the foaming action. There, however, an s.g. value between 0.5 and 1.0 is required, the part-cavity will not hold enough unfoamed moulding material, and therefore excess material must be supplied, which is retained by the ridge or wall provided around the cavity.

BRIEF DESCRIPTION OF DRAWINGS

The invention will now be further described below with reference to an example. It will be understood that the description, which is to be read with reference to the accompanying drawings, is given by way of example only and not by way of limitation.

In the drawings:

FIGS. 5 and 6 are sectional views taken on lines V—V and VI—VI of FIG. 2;

FIG. 7 is a view of a ball formed in a mould cavity defined by the first and second mould members.

DETAILED DESCRIPTION OF DRAWINGS

Figure 1:
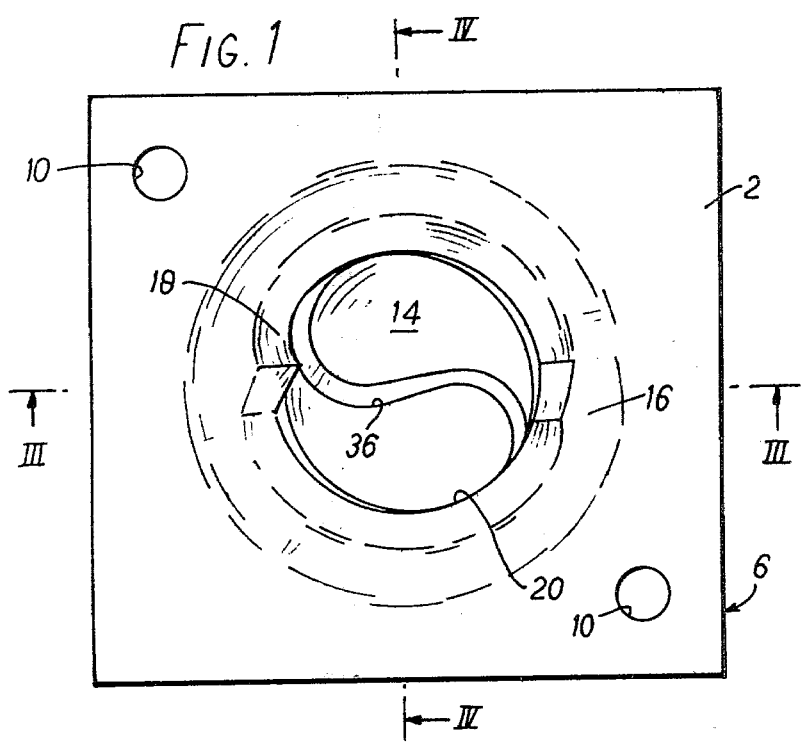
FIG. 1 is a top plan view of a first, lower, mounted member of a mould assembly according to the invention.
Figure 2:
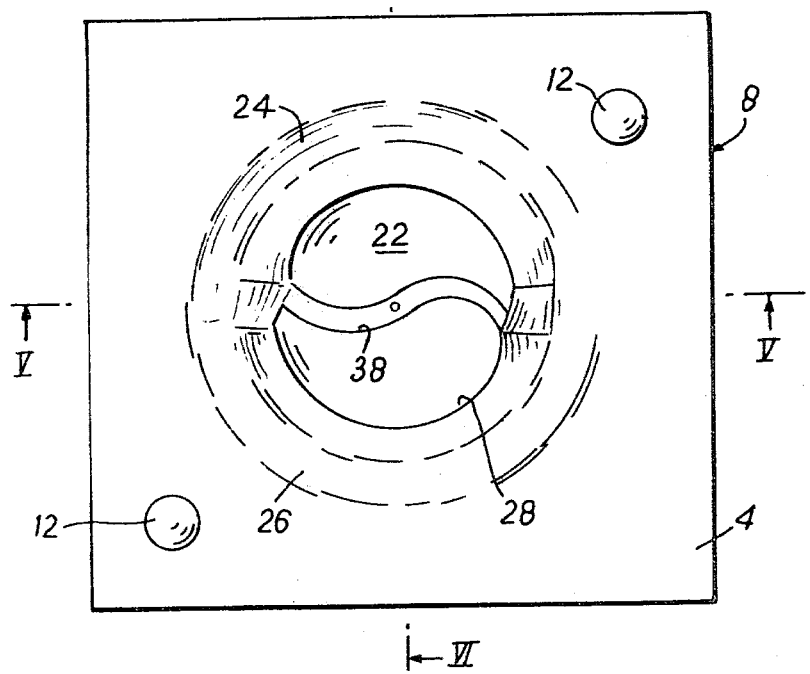
FIG. 2 is an underneath plan view of a second, upper, mould member.

FIGS. 1 and 2 shows the two confronting surfaces 2 and 4 of the first mould member 6 and the second mould member 8, respectively, of a mould assembly. The surface 2 is provided with two locating apertures 10 into which, in use, fit two pins 12 projecting from the surface 4, to ensure accurate alignment of the confronting surfaces.

Figure 3:
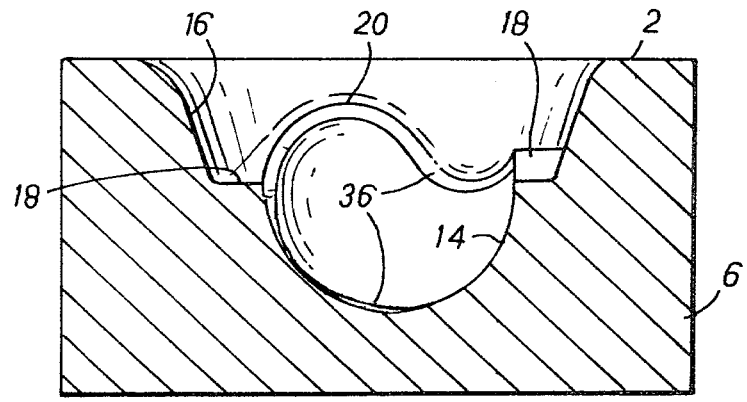
FIGS. 3 and 4 are sectional views taken on lines III—III and IV—IV respectively of FIG. 1.
Figure 4:
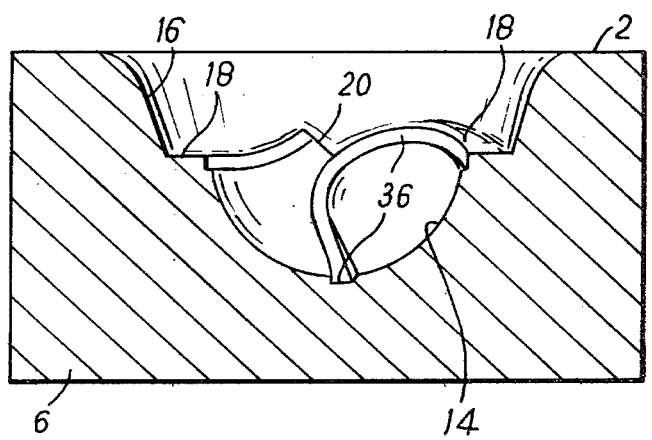

The surface 2 of the mould member 6 provides, at a central region thereof, a part-cavity 14 corresponding in shape to a portion of a soft-ball. Around the part-cavity 14, the surface 2 is contoured to provide a recess 16 (see also FIGS. 3 and 4) having a land surface 18 surrounding the part-cavity 14. The land surface 18 and the wall surface of the part-cavity 14 meet at a continuous lip portion 20.

The surface 4 of the mould member 8 provides at a central region thereof, a part-cavity 22 corresponding in shape to the remaining portion of the soft-ball. Around the part-cavity 22, the surface 4 is contoured to provide a substantially annular projection 24 (see FIGS. 5 and 6), along which runs a land surface 26 corresponding in contour exactly to the land surface 18. The land surface 26 and the wall surface of the part-cavity 22 meet at a continuous lip portion 28.

The two continuous lip portions 20 and 28 meet, in use, to form the parting line of the mould members 2 and 4. The position of this parting line on the moulding product is visible at PL in FIG. 7, where it is indicated by a chain-dot line.

FIG. 7 shows a ball produced from the mould members 6 and 8. Its appearance simulates that of a ball made from two shaped strips of leather, the edges of which are sewn together, and includes a ridge 30, showing an indentation 32 and simulated stitches 34, in imitation of two pieces of leather seamed together at their edges. These features are produced from grooves, 36 and 38, respectively provided in the part-cavities 14 and 22.

Figure 8:
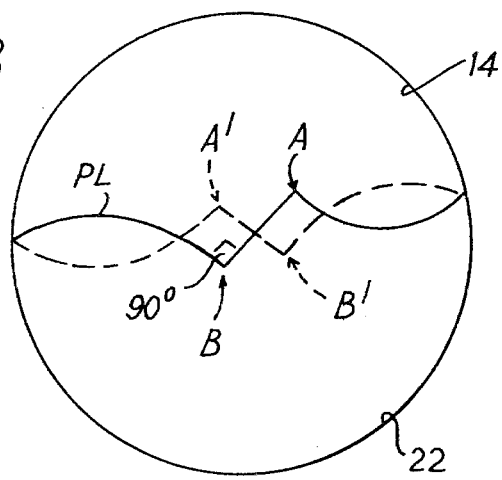
FIGS. 8 and 9 are two diagrammatic representations of the mould cavity, 90° apart, showing the parting line.
Figure 9:
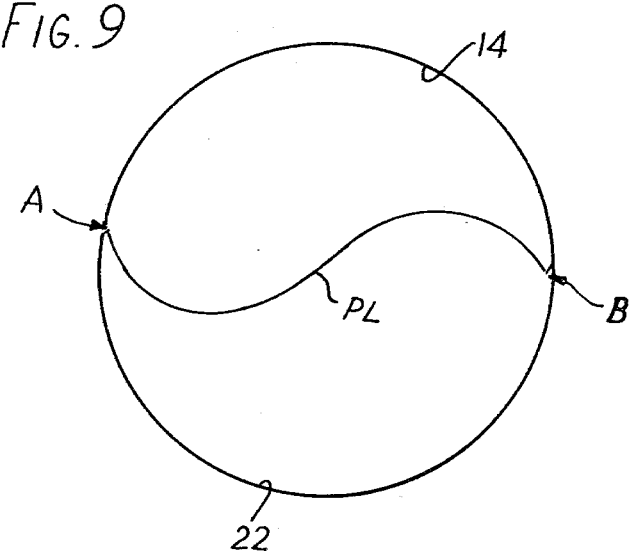

The parting line PL is shown diagrammatically in FIGS. 8 and 9 consisting of four portions. These are a first portion, A to B, which is straight, a second portion, B to A', which is S-shaped, a third portion, A' to B', which is also straight, and a fourth portion B' to A, which is S-shaped. There are four points at which adjacent portions of the parting line meet, and it will be observed that the line portions include an angle of 90° at the region of meeting. It will be appreciated, that while this angle may be varied in other examples not shown, it is not considered advantageous for the angle to be substantially less than a right-angle, but may conveniently be greater, if desired.

The operation of the mould assembly is as follows:

Where the specific gravity of the product ball is no greater than 0.5, the appropriate amount of plastics moulding material is fed into the open mould member 6 so as to fill or substantially fill the part-cavity 14. The mould member 8 is quickly brought down onto the member 6 to close the assembly and to complete the cavity 14,22. The plastics material then foams to fill the cavity. When the foamed material has set, the product ball is de-moulded. If desired, the product may be subjected to a subsequent decoration step, to enhance the visual appearance.

However, where the specific gravity of the product is greater than 0.5, say 0.6 to 0.7, then the mould member 6 will require to be filled with plastics material to a level above that of the lip portion 20 of the part-cavity 14. This may be achieved, due to the presence of the height of the surface 2 above the recess 16, the resultant ridge or wall acting to contain the excess material. When the mould member 8 is brought in to close the mould assembly, plastics material will enter the part-cavity 22, displacing air through a vent 40. Foaming then takes place as before, but the product is more dense.

I claim:

1. A moulding assembly comprising two mould members having mutually confronting surfaces each surrounding a part-cavity, a generally spherical mould cavity being defined when confronting surfaces are in contact with one another, lip portions of said surface defining a continous parting line around a diametral zone of the cavity, said parting line having four portions, comprising two substantially S-shaped portions with two at least substantially straight-line portions, said portions being arranged alternately around the diametral cavity zone, each portion of the line meeting its adjacent portion to include an angle of not substantially less than a right-angle.

2. A mould assembly according to claim 1, wherein the confronting surface of one mould member is provided with a ridge or wall around the part-cavity, of such a height that the mould member may be filled with mouldable material to a level above that of the lip portions of that mould member.

3. A mould assembly according to claim 2, wherein the second mould member is provided with a vent for passage of air displaced from its part-cavity.

4. A mould assembly according to any of the preceding claims, wherein the two part cavities are each provided with grooves and recesses to simulate a raised stitched seam on a product moulded therefrom.

* * * * *